UNITED STATES PATENT OFFICE.

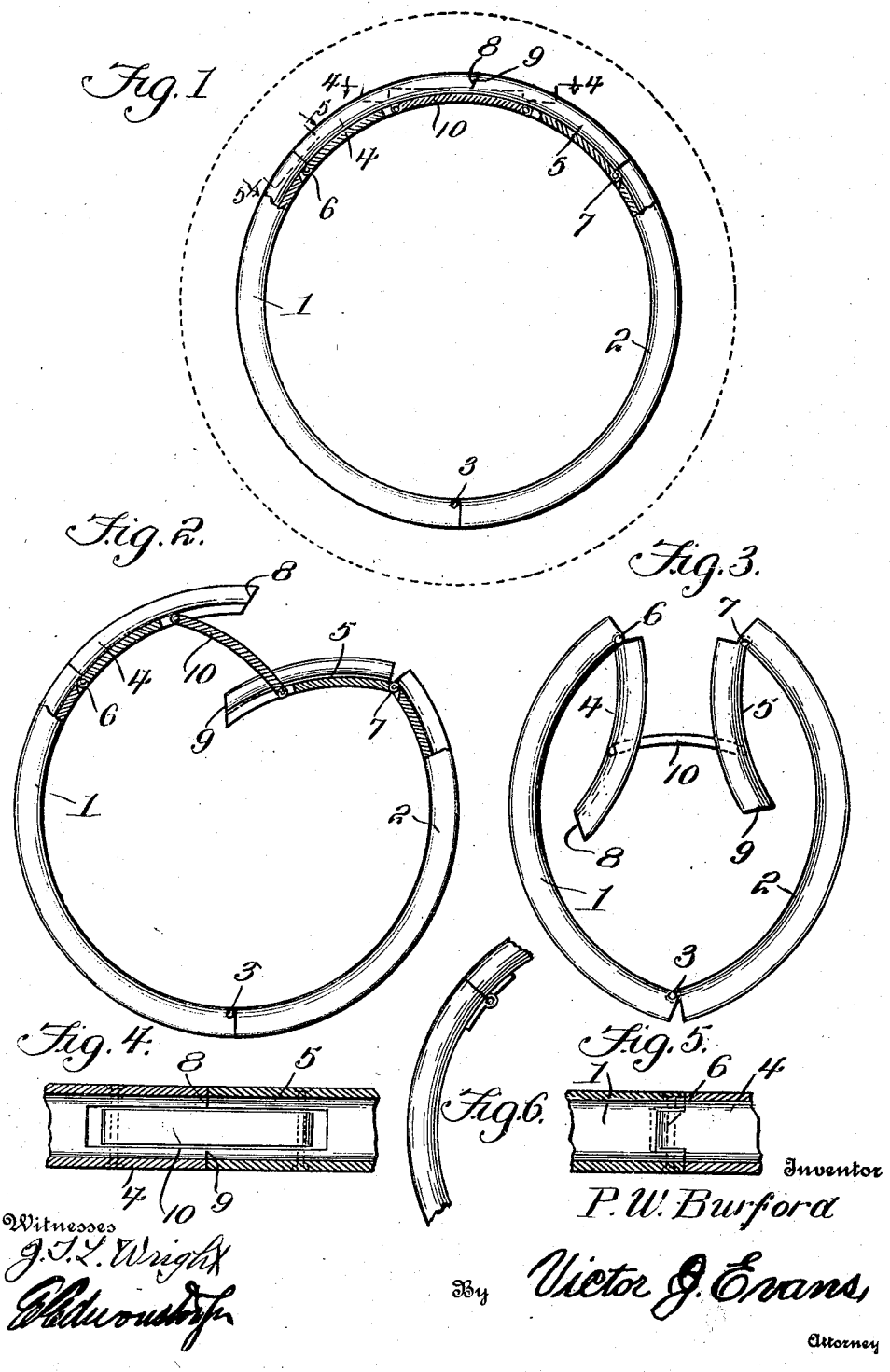

PERCY W. BURFORD, OF EAST ROCHESTER, NEW YORK.

TIRE-RIM.

1,192,853.

Specification of Letters Patent.  Patented Aug. 1, 1916.

Application filed July 26, 1915. Serial No. 41,998.

*To all whom it may concern:*

Be it known that I, PERCY W. BURFORD, a citizen of the United States, residing at East Rochester, in the county of Monroe and State of New York, have invented new and useful Improvements in Tire-Rims, of which the following is a specification.

This invention relates to tire rims and more particularly to that type of rim which is removably mounted upon a vehicle wheel and adapted to be detached and collapsed to facilitate the removal of the tire.

Heretofore, rims of this character have been constructed of hinged sections with free ends arranged to be sprung past each other or to fold inwardly, but as these ends were not connected, there was no assurance of their assuming their proper relative position and maintaining the same when the parts of the rim were held to the tire.

The object of this invention, therefore, is to avoid this difficulty, and, broadly speaking, the device consists in providing a sectional rim, the sections of which are hinged together and the free ends connected in such manner that when restored to operative tire holding position, their proper relative position is always assured.

Further objects of the invention will appear as the following specific description is read in connection with the accompanying drawing which forms a part of this application, and in which:—

Figure 1 is an elevation of the rim in operative tire holding position. Fig. 2 is a similar view with the rim partially collapsed. Fig. 3 is a similar view with the rim fully collapsed and in position for the removal of the tire or replacement thereof. Fig. 4 is a section on the line 4—4 of Fig. 1. Fig. 5 is a sectional view on the line 5—5 of Fig. 1. Fig. 6 is a detail elevation showing a modified hinge connection.

In the specific embodiment of the invention, the device comprises a pair of sections 1 and 2 hingedly connected together as shown at 3 and having a pair of short locking sections 4 and 5 connected to their free terminals by means of the hinges 6 and 7. The locking section 4 has its free end beveled inwardly as shown at 8 to correspond with an outward bevel 9 formed on the end of the section 5. These sections, as shown, are pivotally connected together by a link or links 10 which insures the proper relation of the parts and facilitates the collapsing of the sections and the forcing of the sections to operative tire holding position. When it is desired to remove the tire from the rim, the section 5 is moved inwardly to the position shown in Fig. 2 and then both sections 4 and 5 are moved inwardly to the position shown in Fig. 3. The sections 1 and 2 are thus drawn toward each other which permits the ready removal of the tire. The tire is placed upon the rim when in position shown in Fig. 3 and the sections 1 and 2 then separated to their fullest extent. The section 4 is pushed into position to circumferentially aline with the sections 1 and 2 and the section 5 is forced up so that its beveled end 9 engages and rides upon the beveled end 8 of the sectiton 4. When the rim is in this position, it may be placed upon the wheel and secured in any suitable manner.

What is claimed is:—

1. A rim comprising a pair of arcuate sections, hingedly connected together, a pair of locking sections adapted to circumferentially aline with the first mentioned sections, hinges connecting the locking sections to the first mentioned sections, and a link connecting the locking sections, said locking sections having mating beveled ends.

2. A rim comprising a pair of arcuate sections hingedly connected together, a pair of locking sections adapted to circumferentially aline with the first mentioned section and each having a longitudinally extending slot between its sides at one end, mating beveled faces on the slotted ends of the locking sections, and an arcuate link adapted to normally lie within said slots and having its respective terminals pivotally connected with the locking sections between the ends thereof and below the beveled faces on said sections.

In testimony whereof I affix my signature in presence of two witnesses.

PERCY W. BURFORD.

Witnesses:
THOMAS CONNERS,
CLAIR H. STILWELL.